Jan. 5, 1965   A. BRODER ETAL   3,164,821
FLUID PRESSURE VIBRATION DETECTOR
Filed Dec. 28, 1960   2 Sheets-Sheet 1
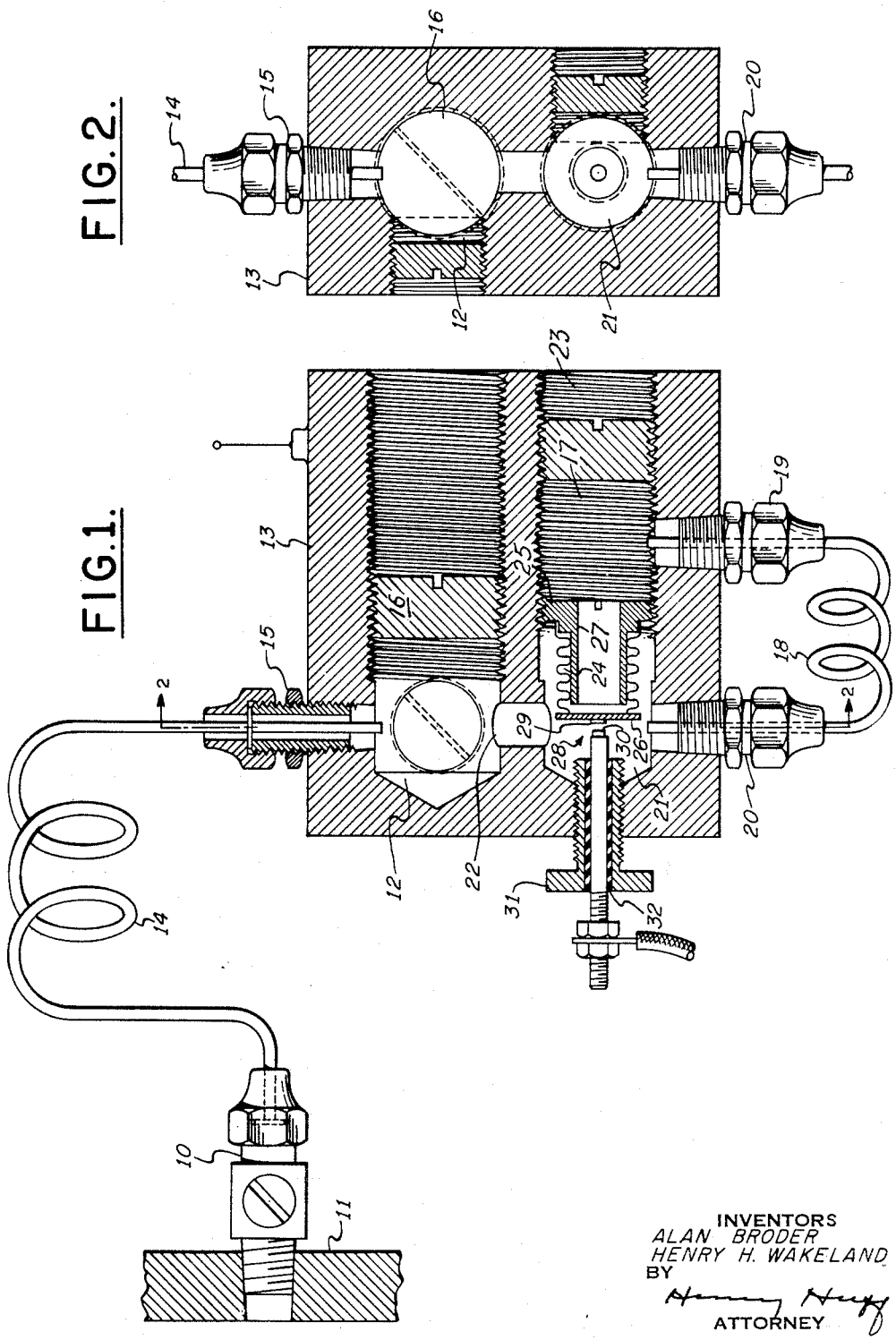
INVENTORS
ALAN BRODER
HENRY H. WAKELAND
BY
ATTORNEY Jan. 5, 1965 A. BRODER ETAL 3,164,821
FLUID PRESSURE VIBRATION DETECTOR
Filed Dec. 28, 1960 2 Sheets-Sheet 2

INVENTORS
ALAN BRODER
HENRY H. WAKELAND
BY
ATTORNEY

United States Patent Office 3,164,821
Patented Jan. 5, 1965

3,164,821
FLUID PRESSURE VIBRATION DETECTOR
Alan Broder, Glen Oaks, and Henry H. Wakeland, New York, N.Y., assignors to Sperry Rand Corporation, Great Neck, N.Y., a corporation of Delaware
Filed Dec. 28, 1960, Ser. No. 79,036
5 Claims. (Cl. 340—236)

This invention relates to a device for detecting fluid pressure vibrations that are characteristic of stall and surge conditions in a system wherein a compressor supplies fluid under pressure for example to an engine. In stalls, the capacity of the compressor is reduced due to fluid separation in the system. If the stall is of sufficient magnitude, it may cause complete loss of pumping ability of the compressor and cessation of fluid flow in the system. Sequential cessation and resumption of fluid flow in the compressor result in surge conditions in the system. Effects of stall and surge in systems of this character include excessively high exhaust gas temperature, large cyclic changes in thrust, flame out when the compressor is part of a gas turbine or jet propulsion engine, and possible damage in the duct work of the system as well as in the structure of the engine. In systems where either or both of these conditions is a problem, the improved detecting instrument enables prompt corrective action to be taken by providing an indication of the vibratory pressure which is characteristic of the condition. Such indication may be utilized for correction by automatic means or manual control. Compressor stall and surge exhbit characteristic pressure fluid vibrations which can be detected by the improved device according to their amplitude and frequency, the different ranges of frequency and amplitude depending on the installation and the components of the compressor system.

An object of the invention is to provide an instrument that will enable a system including a compressor to be operated relatively free of stall and surge conditions.

A further object is to provide an instrument which may initiate the operation of other devices which automatically stop stall and surge and which thus allow compressor operation closer to the stall margin.

One of the features of the invention resides in the provision of an indicating instrument or detector of the class described in which a closed end fluid flow line includes entrant and end compartments and a vibratory diaphragm differentially responsive to the fluctuation of the fluid pressure in the respective compartments.

A further feature of the invention is provided by inclusion in the instrument of a first acoustic impedance passageway between the entrant compartment and the source of fluctuating pressure and a second acoustic impedance passageway connecting the entrant pressure compartment and the end pressure compartment. This combination of passageways and chambers at the vibratory diaphragm provides a pressure differential responding to vibratory pressure at the inlet which is characteristic of stall and surge conditions only.

The foregoing and other objects and features of the invention will be best understood from the following description and the accompanying drawings in which:

FIG. 1 is a vertical section of an embodiment of the improved instrument in which the compartments and diaphragm are included in a unitary housing, the provided impedance passageways being coiled tubes that are removable from the housing;

FIG. 2 is a sectional view taken on line 2—2, in FIG. 1;

Figure 3:
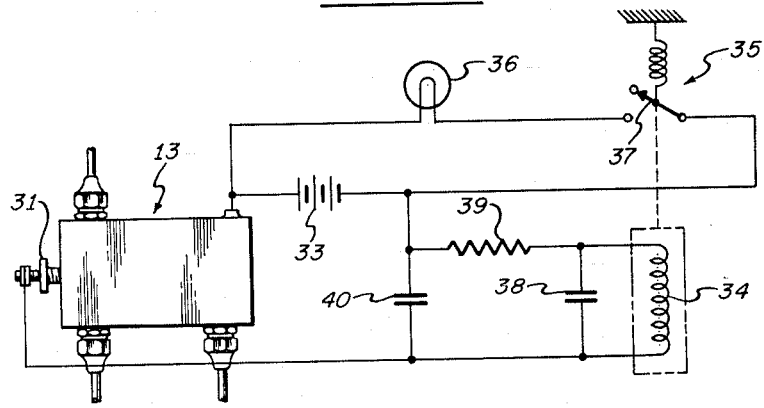
Figure 4:
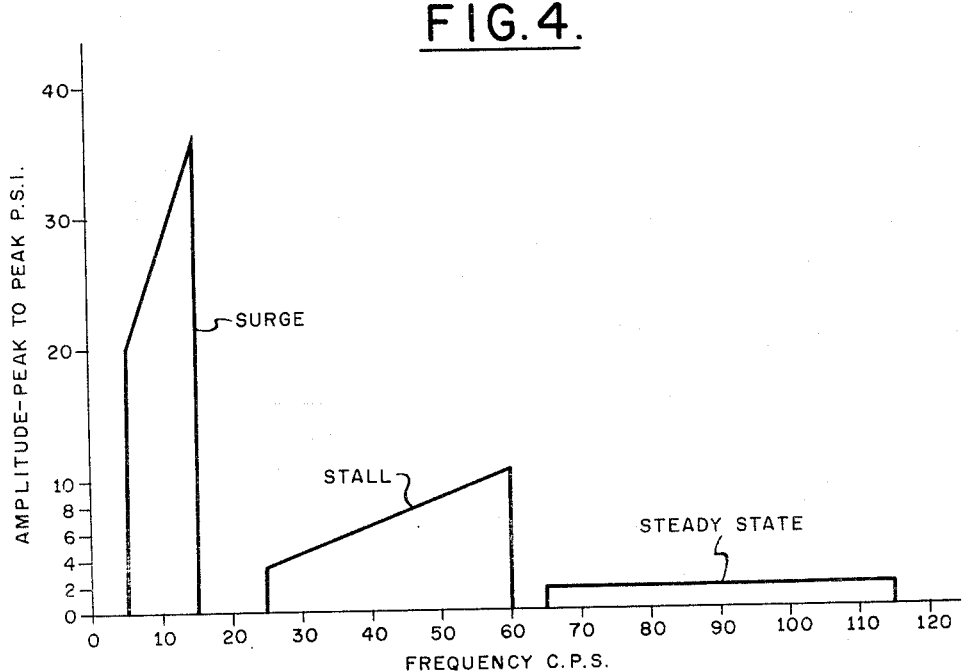

FIG. 3 is a circuit diagram showing an embodiment of the inventon in which the indicator of the instrument is represented as an electric lamp that is controlled by the amplitude and frequency of the vibrations of the diaphragm, and FIG. 4 is a graph in pressure amplitude and frequency coordinates showing representative curves of stall and surge characteristics for an illustrative compressor-engine combination.

The pressure fluctuations of a system of the type described are preferably obtained through a suitable connection of the device to the system on the discharge side of the compressor. As represented in FIG. 1, the device or instrument is connected to the system through a suitable tube coupling 10 in a threaded opening of a wall 11 to the left of which is located the source of fluctuating fluid pressure supplied by the compressor to the engine. The wall 11 may be a portion of the housing of the compressor per se, a portion of the duct work connecting the compressor and engine, or a portion of the engine housing. As indicated in FIG. 4 for an illustrative system, characteristic fluid pressure vibrations at the source during surge conditions vary in frequency between five and fifteen cycles per second and in peak to peak amplitude of vibratory pressure from twenty one to thirty seven pounds per square inch. During stall conditions for the illustrative compressor, the indicated characteristics shown in the graph vary in frequency between twenty five and sixty cycles per second and peak to peak amplitude of vibratory pressure from three to ten pounds per square inch. The diaphragm or bellows of the improved instrument reacts to the noted characteristic vibrations to detect conditions of both stall and surge. It does not substantially react to pressure fluctuations of the source at other frequency and amplitude values.

The device shown in FIG. 1 includes a closed end fluid flow line providing a first compartment or chamber 12 in a housing 13. The chamber 12 is connected to the fluctuating pressure source through a fluid passageway or conduit of determined length and cross section that is shown in the form of coiled tubing 14 of uniform inside diameter. As shown, one end of the tubing or passageway is connected to the wall 11 through the tube coupling 10. A second suitable tube coupling 15 connects the other end of the tubing 14 to the housing 13. As a means for adjusting the volume of the compartment or chamber 12 of the device, the housing 13 includes a threaded opening and an air tight, threaded plug 16 that fits the opening in the housing. The chamber or compartment 12 in the air tight housing 13 is accordingly connected to the source of fluctuating pressure through the tubing or passageway 14 which provides an acoustic impedance for noncharacteristic pressure vibrations that results in the attenuation of the amplitude of the pressure vibrations which in the selected example are above the frequency ranges five to fifteen cycles per second and twenty five to sixty cycles per second. Accordingly, in the steady state condition shown in FIG. 4, the amplitudes of the vibrations over a frequency range above sixty-five cycles per second are prevented from exceeding two pounds per square inch.

As shown in FIG. 1, the closed fluid line includes a second or end compartment or chamber 17 in housing 13 that is connected to the first compartment 12 by a second passageway, conduit or coiled tubing 18 of predetermined length and inside diameter. A tube coupling 19 connects one end of tubing 18 to an opening in the housing 13 connected to compartment 17. The opposite end of the tubing 18 is connected to a further opening in the housing 13 by tube coupling 20 and communicates with compartment 12 by way of connecting extension chamber or compartment 21 and the nonrestrictive opening 22. Chambers or compartments 12 and 21 and opening 22 provide the entrant chamber or compartment of the closed line fluid flow device. The end chamber of the closed line is provided by air tight chamber 17 in the housing 13. The volume of chamber 17 is made adjustable by threading the wall of the chamber and providing an air tight, threaded plug 23 thereat. The tubing 18 of the structure provides a conduit or passageway between the entrant and end chambers of the closed fluid line that provides a second acoustic impedance for the noncharacteristic pressure vibrations at the source. The length and inside diameter of tubing 18 is accordingly such as to further attenuate in combination with the volume of chamber 17 the amplitude of the vibration at frequencies other than the characteristic frequencies indicated in FIG. 4 with respect to the chamber 17 at the end of the closed fluid line. The selected volumes of the respective chambers and the length and diameter of the connecting tubing depends on the stall and surge characteristics of the system with which the detector is used. The instrument accordingly provides for adjustment of the volumes of the respective compartments. The tube couplings to the housing 13 and wall 11 for the connecting tubing 14 and 18 are removable from the housing 13 for replacement purposes.

As further shown in FIG. 1, the improved instrument includes vibratory means that is differentially responsive to the characteristic fluid pressure vibrations in the respective entrant and end chambers of the housing 13. The means shown is provided by a diaphragm means vented to the respective chamber or tubular bellows 24 with an open end connected to housing 13 by a threaded sleeve 25 and a closed end 26 free to vibrate responsive to the fluid pressure differential between the respective compartments of the device. As shown, the bellows is connected in the housing 13 to provide a portion of the wall of each of the chambers 21 and 17. For chamber 21 the exterior surface of the bellows or diaphragm provides a portion of the wall of entrant chamber 21. The interior surface of the bellows or diaphragm 24 provides a portion of the wall of the end chamber 17 being connected thereto through the opening 27 in the sleeve 25. In a non-reactive condition of the instrument, the relatively steady fluid pressure level of the system at the source is directly communicated to the end of the fluid line through tubing 14 and 18 and the fluid pressure in both the entrant compartment and the end compartment are the same. Under these conditions, the pressures affecting the bellows 24 are the same and the free end of the bellows accordingly does no move or vibrate. As the characteristic conditions detected by the instrument occur, and the fluid pressure at the source fluctuates as indicated in FIG. 4, the fluid pressure at the source either increases or decreases with respect to the fluid pressure in the end chamber 17. Where it initially increases, the fluid flow is from the source toward the end chamber and the pressure in chamber 21 increases with respect to end chamber 17. Where it initially decreases, the fluid flow is from the end chamber 17 toward the source and the pressure in chamber 21 decreases with respect to the end chamber. The differential pressure fluctuations in the respective compartments accordingly result in vibration of the free end of the diaphragm. The amplitude of the vibration is in accordance with the amplitude of the characteristic pressure fluctuation indicated in the graph for both surge and stall conditions. The tubing 17 of the instrument provides a time lag for the passage of pressure fluid between chamber 21 and the source. Likewise, tubing 18 restricts the flow of pressure fluid between the connected chambers 21 and 17 of the closed end flow line. The tubing in the instrument functions as part of the acoustic filter or impedance in the line which permits steady state pressures to influence equally the opposite sides of the diaphragm and in combination with the chamber volumes allows the influence thereon of pressure fluctuations characteristic of stall or surge.

The instrument further includes means for indicating the detected characteristic amplitude and frequency ranges corresponding to the surge and stall conditions represented in FIG. 4. As shown in FIGS. 1 and 3, the improved device further includes an electrical off-on switch 28 with a contact terminal 29 on the vibratory closed end 26 of the bellows. The stationary or fixed terminal 30 is suitably spaced from terminal 29 in accordance with the amplitude characteristic of the vibration in stall and surge required to operate the indicator of the device. In the structure shown in FIG. 1 for this purpose, the terminal 30 is adjustably mounted on the housing 13 by a screw piece 31 and is insulated from the housing 13 by an insulating sleeve 32. In the frequency sensitive circuit shown in FIG. 3, switch 28 is arranged in series with a source of power such as battery 33 and the winding 34 of a relay 35 that controls the operation of a lamp circuit including electric lamp 36 and the armature 37 of the relay. The indicating lamp 36 of the provided arrangement is energized by the battery 33 when the winding 34 of the relay 35 is energized and the armature 37 is held in a position closing the lamp circuit. Operation of the lamp 36 is dependent upon vibrations of an amplitude sufficient for the switch terminals 29 and 30 to close as well as upon the frequency of the contacting intervals which are higher for stall conditions of detection than surge conditions of detection as indicated in FIG. 4. As shown in FIG. 3, the relay circuit includes a capacitor 38 across the relay winding 34, an input capacitor 40 and a series resistor 39 that controls the time period of operation of the relay 35 so that the lamp will flash on and off at surge frequencies and will shine steadily at the stall frequencies. In this connection, at stall frequencies the shorter interval between closings of switch 28 alow the capacitors 38 and 40 to maintain a charge sufficient to keep relay 35 closed during brief openings of switch 28. The indicator will therefore not flash but will shine steadily at stall frequencies. At the lower frequency conditions, the noted elements do not extend the time period of closure of the relay 35 whose armature is then effective to make and break the lamp circuit in accordance with the operations of the switch 28 so that the lamp 36 flashes. The instrument is accordingly able to distinguish between the detected characteristic fluid pressure conditions of surge and stall. The means for detecting the amplitude and frequency of the characteristic pressure vibration accordingly includes a frequency sensitive circuit having a switch with a movable terminal connected to the vibratory or diaphragm means and a stationary terminal normally spaced in relation to the movable terminal in acordance with the amplitude of the characteristic vibration of the vibratory or diaphragm means.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A device for detecting characteristic fluid pressure vibrations at a source of fluctuating fluid pressure including a closed end fluid flow line having an entrant pressure compartment, a first acoustic impedance providing passageway for noncharacteristic pressure vibrations connecting the entrant compartment to the fluctuating fluid pressure source, and end pressure compartment, a second acoustic impedance providing passageway for noncharacteristic pressure vibrations connecting the entrant pressure compartment and the end pressure compartment, a vibratory bellows differentially responsive to the characteristic fluid pressure vibrations in the respective compartments, and means for indicating the amplitude and frequency of the characteristic vibration including a frequency sensitive circuit having a switch with a movable terminal connected to the bellows and a stationary terminal normally spaced in relation to the movable terminal in accordance with the amplitude of the characteristic vibration of the bellows.

2. An instrument for detecting characteristic fluid pressure vibrations at a source of fluctuating fluid pressure comprising a closed end fluid flow line including a housing having an entrant fluid pressure compartment and an end fluid pressure comparment, a fluid pressure tube providing a first path of acoustic impedance for noncharacteristic pressure vibrations connecting the fluctuating fluid pressure source to the entrant compartment, a fluid pressure tube providing a second path of acoustic impedance for noncharacteristic pressure vibrations between the entrant compartment and the end compartment, a tubular bellows with an open end fixedly mounted in the housing between the compartments and a closed end free to vibrate differentially responsive to the characteristic fluid pressure vibrations in the respective compartments, and means for indicating the amplitude and frequency of the characteristic vibrations including a frequency sensitive circuit having a switch with a terminal fixed to the closed end of the bellows and a terminal fixed to the housing normally spaced in relation to the bellows terminal in accordance with the amplitude of the characteristic vibration of the bellows.

3. A device for detecting characteristic fluid pressure vibrations at a source of fluctuating pressure including a closed end fluid flow line having an entrant pressure chamber connected to the pressure source through a first path of acoustic impedance for noncharacteristic pressure vibrations, an end pressure chamber connected to the entrant pressure chamber through a second path of acoustic impedance for noncharacteristic pressure vibrations, and vibratory means differentially responsive to the characteristic fluid pressure vibrations in the respective chambers and means for detecting the amplitude and frequency of the characteristic vibration including a frequency sensitive circuit having a switch with a movable terminal connected to the vibratory means and a stationary terminal normally spaced in relation to the movable terminal in accordance with the amplitude of the characteristic vibration of the vibratory means.

4. An instrument for detecting characteristic fluid pressure vibrations at a source of fluctuating fluid pressure comprising a closed end fluid flow line including a housing having an entrant air tight pressure chamber, a conduit between the entrant chamber and the source of fluctuating fluid pressure providing a first acoustic impedance for noncharacteristic pressure vibrations, an end air tight pressure chamber, a conduit between the entrant chamber and end chamber providing a second acoustic impedance for noncharacteristic pressure vibrations, diaphragm means vented to the entrant and end chambers differentially responsive to the characteristic pressure vibrations, and means for indicating the amplitude and frequency of the characteristic vibration including a frequency sensitive circuit having a switch with a movable terminal connected to the diaphragm means and a stationary terminal normally spaced in relation to the movable terminal in accordance with the ampltude of the characteristic vibration of the diaphragm means.

5. An instrument of the character claimed in claim 4, in which said diaphragm means is a tubular bellows having an open end fixedly mounted in the housing between the entrant and end chambers and a closed end, the movable terminal of the switch is fixedly mounted on the closed end of the bellows, and the stationary terminal of the switch is mounted on the housing in spaced relation to the movable terminal.

References Cited in the file of this patent

UNITED STATES PATENTS

| | | |
|---|---|---|
| 2,445,335 | Philbrick et al | July 20, 1948 |
| 2,637,999 | Klebba | May 12, 1953 |
| 2,638,579 | Dyche et al. | May 12, 1953 |
| 2,926,524 | Sanders | Mar. 1, 1960 |
| 3,022,498 | Alcott | Feb. 20, 1962 |